J. R. ADAMS.
WHEEL HUB AND BEARING.
APPLICATION FILED APR. 30, 1919.
1,350,851.
Patented Aug. 24, 1920.
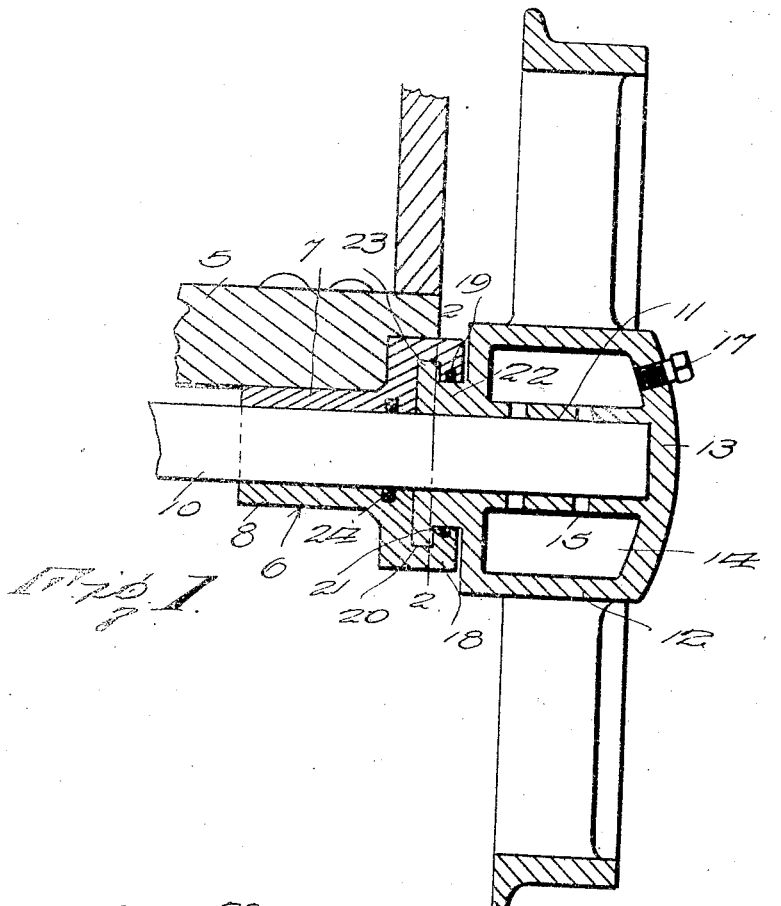
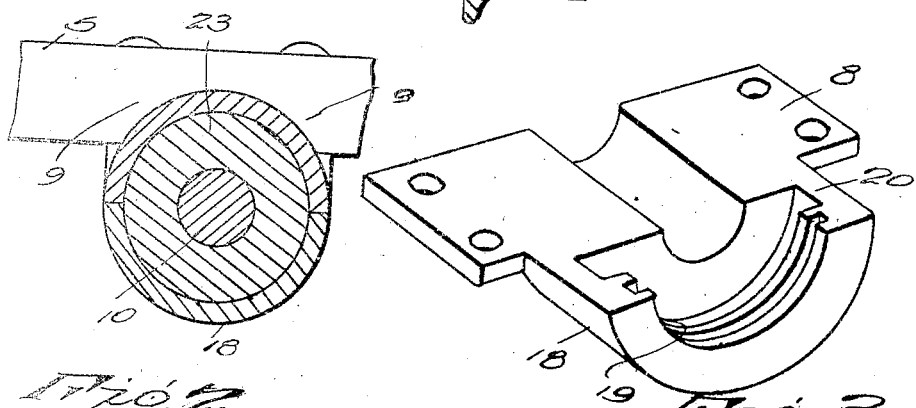
James Roy Adams
Inventor
Geo. P. Kimmel
Attorney

UNITED STATES PATENT OFFICE.

JAMES ROY ADAMS, OF SOMERSET, PENNSYLVANIA.

WHEEL-HUB AND BEARING.

1,350,851.

Specification of Letters Patent.

Patented Aug. 24, 1920.

Application filed April 30, 1919. Serial No. 293,734.

*To all whom it may concern:*

Be it known that I, JAMES ROY ADAMS, a citizen of the United States, residing at Somerset, in the county of Somerset and State of Pennsylvania, have invented certain new and useful Improvements in Wheel-Hubs and Bearings, of which the following is a specification.

This invention has for its object to improve the wheel hub and bearing structure of rolling stock and the distinguishing features of compactness and simplicity which characterize the improvement render it specially adaptable to mining cars.

Another and more specific object of the invention is the provision of a hub structure having an internal chamber communicating with the bore of the hub by restricted passages and adapted to contain a quantity of lubricant by which the wheel is maintained in a lubricated condition.

Another object is the provision of an integral flange upon the hub of the wheel coacting with a specially constructed bearing to limit the longitudinal thrust of the wheel with relation to the bearing.

With these and other objects in view as will appear as the description proceeds the invention comprises the novel features of construction, combination of elements and arrangement of parts which will be more fully described in the following specification and set forth with particularity in the claim appended hereto:

Figure 1 represents a longitudinal sectional view through the improved wheel and bearing, Fig. 2 represents a transverse sectional view on the line 2—2 of Fig. 1, and, Fig. 3 represents a perspective view of the detachable bearing cap removed.

Referring to the drawing in detail, wherein similar reference characters designate corresponding parts throughout the several views, the numeral 5 indicates the fragment of a car body or other supporting structure under which is arranged the improved bearing designated generally by the numeral 6 and including the upper relatively stationary part 7 and the detachable companion member or cap 8. The facial abutment of the upper bearing part 7 to the under side of the support 5 affords adequate foundation for the bearing and the cap which is detachably secured in position by bolts 9.

The terminal of axle 10 is mounted in the bore of the bearing 6 and is preferably of such external diameter as to obtain sufficient friction by contact with the inner surface of the bearing to maintain the axle against rotary movement. The terminal of the axle projects beyond the bearing and is received within the bore 11 of the wheel hub 12 the rim of which may or may not be provided with a flange, according to the use to which the wheel is to be applied. The end of the bore 11 is closed by an end wall 13 forming an integral part of the wheel hub and limiting longitudinal movement of the shaft with relation thereto and the body of the hub is formed with an internal lubricant containing chamber 14 of annular form and having communication with the bore 8 to passages 15 through which the lubricant contained in the chamber is conducted to the bore and distributed upon the bearing surface of the axle 10. A filling opening 16 is conveniently located in the side wall of the chamber 14 and is provided with a closure plug 17 preventing loss of the lubricant contained in the chamber.

The terminals of the companion bearing members 7 and 8 adjacent the wheel are enlarged and internally grooved to provide a circular flange 18 carrying inwardly directed portion 19 confining the internal groove 20. The inwardly directed portion 19 of the flange which lies in a radial plane of the bearing is formed in its inner edge with a relatively narrow groove receiving a packing ring 21 of yieldable absorbent material designed to maintain the adjacent portion of the bearing in an effectively lubricated condition and also to prevent the escape of the lubricating fluid therefrom.

The inner terminal of the hub 12 is formed with an extension 22 forming, upon its inner surface, a continuation of the wall of the bore 11 and arranged concentrically therewith. The terminal of the extension is formed with a circular flange 23 received within the groove 22 of the bearing 6, the gasket or packing ring 21 having contact with the body part of the extension intermediate the flange 23 and the hub 12.

The companion bearing members 7 and 8 inwardly of the circular groove or channel 20 are formed with registering grooves receiving a supplementary packing ring 24 also constructed of yieldable absorbent material and adapted to prevent the loss of lubricant by its leakage inwardly through the bore of the bearing 6.

In the actual application of the invention to a car body or other wheel mounted vehicle the greater portion of the weight of such vehicle is supported upon the axle 10 and is transmitted thereby to the wheels 12, the end walls 13 of the bores of the wheel hubs limiting the longitudinal movement of the axle and preventing displacement thereof. However, a portion of the weight of the vehicle is supported by the flange extensions 22 bearing within the flanged terminals 18 of the bearing 6 but the principal function of the extensions and flanges is to limit the axial thrust of the wheels and to maintain the latter in proper position with relation to the car truck or body. The lubricant contained in the chamber 14 finds its way upon the bearing surfaces of the wheel hub and axle through the passages 15, an adequate supply of lubricant being maintained in the chamber by introduction through the filling opening 16.

What I claim is:

The combination with a split bearing having an annular interior bearing channel, and an axle journaled in the bearing, a traction wheel formed with a hollow hub and having an axle socket portion for receiving the outer end of the axle, and with an annular bearing rib rotatably engaging in the channel, the outer end of the hub being integral with the socket portion to close the latter and provide an abutment wall for the outer extremity of the axle.

In testimony whereof, I affix my signature hereto.

JAMES ROY ADAMS.